Figure 1:
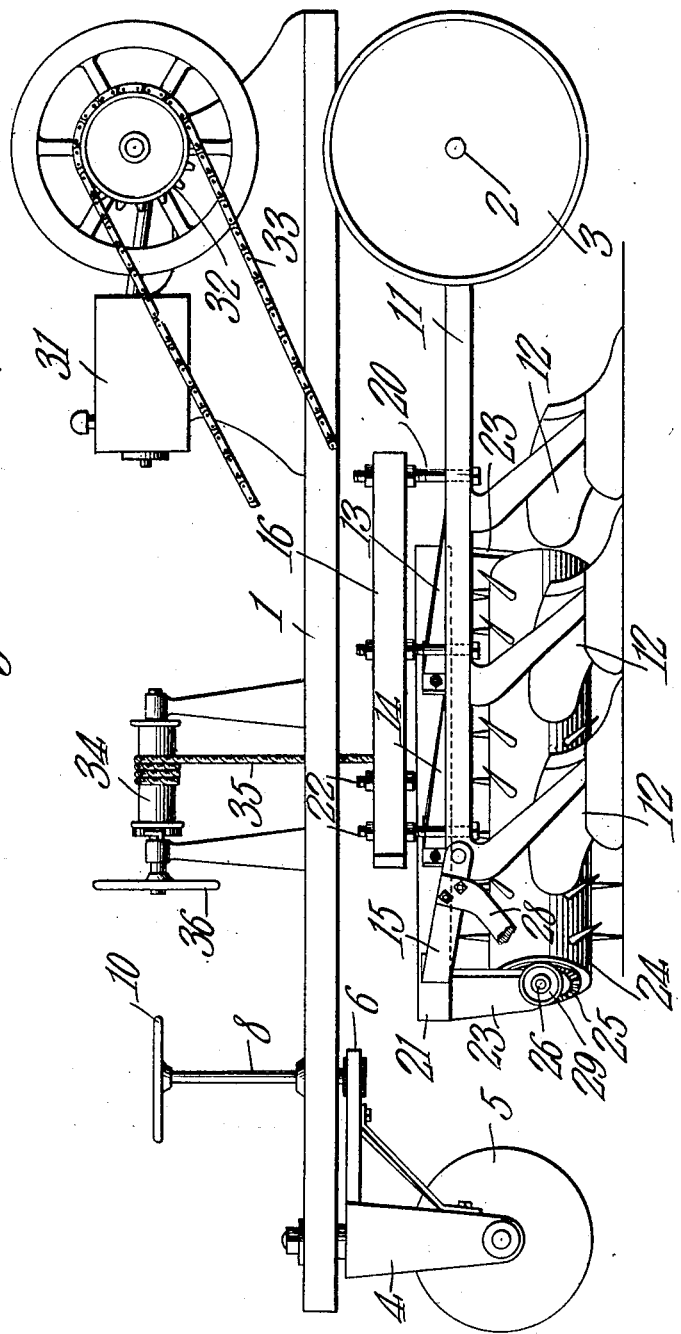

C. MARVIN.
PLOW.
APPLICATION FILED JUNE 8, 1907.

No. 904,792.

Patented Nov. 24, 1908.
2 SHEETS—SHEET 1.

WITNESSES:

INVENTOR.
Cloyd Marvin,
By C. A. Snow & Co.
ATTORNEYS

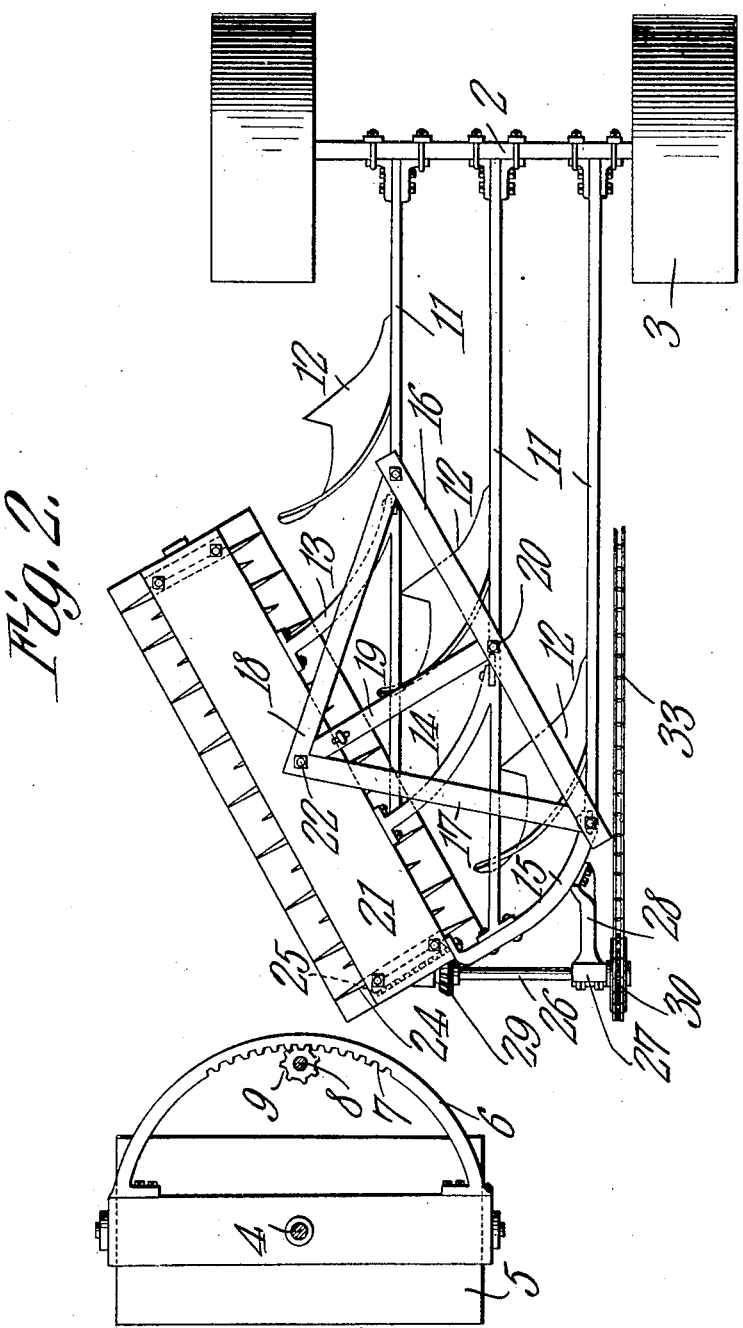

UNITED STATES PATENT OFFICE.

CLOYD MARVIN, OF FINDLAY, OHIO.

PLOW.

No. 904,792.  Specification of Letters Patent.  Patented Nov. 24, 1908.

Application filed June 8, 1907.  Serial No. 377,979.

*To all whom it may concern:*

Be it known that I, CLOYD MARVIN, a citizen of the United States, residing at Findlay, in the county of Hancock and State of Ohio, have invented a new and useful Plow, of which the following is a specification.

This invention has relation to plows and it consists in the novel construction and arrangement of its parts as hereinafter shown and described.

The object of the invention is to provide a plow of the gang type which is provided with an independently rotating harrow located behind the gang of plows. The axis of the harrow is parallel with the disposition of the gang and consequently operates upon the soil turned by each plow with uniformity and practically at the time that the turning is accomplished. A motor is mounted upon the plow and is operatively connected with the harrow for rotating the same independently. A roller is located behind the harrow and also supports the rear portion of the plow whereby the earth is practically simultaneously turned, harrowed and rolled.

In the accompanying drawing:—Figure 1 is a side elevation of the plow, and Fig. 2 is a top plan view of the same with parts removed.

The plow consists of a platform 1 which is mounted at its forward portion upon the axles 2 upon which is journaled the ground wheels 3. The caster bracket 4 is pivoted to the rear portion of the frame 1 and the roller 5 is journaled in said caster bracket. The bracket 4 is provided with a substantially semi-circular portion 6 which lies in a plane parallel with the plane of the platform 1 and is provided upon its inner side with a series of gear teeth 7. The shaft 8 is journaled for rotation in the platform 1 and is provided at its lower end with a pinion 9 which meshes with the teeth 7. The shaft 8 is provided at its upper end with a hand wheel 10. It is obvious that by turning the shaft 8 that the portion 6 will be moved in an arc about the lower end thereof which will turn the caster bracket 4 on its pivot and correspondingly turn the roller 5 so that the implement may be effectually steered through the instrumentality of the shaft 8 and its connection.

The plow beams 11 are connected at their forward ends to the axle 2 and are provided at their rear ends with the plow shares 12. Said shares are arranged in a gang diagonally disposed with relation to the line of draft of the implement in the usual manner. The forward ends of the arms 13, 14, and 15 are pivotally connected to the rear portions of the beams 11 and are adapted to swing vertically but are retained against relative lateral movement. The bar 16 connects the rear portions of the beams 11 together and holds them in proper parallel relation to each other. The said bar 16 forms one side of a triangular frame, the other sides of which are formed by the bars 17 and 18 and the bar 19 extends from the apex of the triangular frame to the bar 16. The bars 16, 17, 18 and 19 are superimposed with relation to the beams 11 and the arms 13, 14, and 15 and are adjustably connected with the beams by means of the bolts 20. The sill 21 is connected by means of a bolt 22 with the apex of the triangular frame consisting of the bars 16, 17 and 18. The brackets 23 depend from the ends of the sill 21 and the rotating harrow element or member 24 is journaled between the said brackets 23. The shaft of the member 24 is provided at one end with a beveled gear wheel 25. The stub shaft 26 is journaled for rotation in a bearing 27 provided at the end of the arm 28 which is attached to the arm 15. The beveled pinion 29 is fixed to the shaft 26 and meshes with the gear wheel 25. The sprocket wheel 30 is fixed to the opposite end of the stub shaft 26. The engine 31 is mounted upon the platform 1 and its crank shaft is provided with a sprocket wheel 32. The sprocket chain 33 passes around the sprocket wheels 30 and 32. Through the said sprocket wheels and chain the engine 31 imparts independent rotary movement to the harrow member 24. The said member 24 is located directly behind the gang of plows and its longitudinal axis extends parallel with the oblique disposition of the gang of plows with relation to the line of draft. Thus the harrow member operates upon the soil as it is turned by the plow and pulverizes the same. A hoisting drum 34 is mounted upon the platform 1 and the cable 35 winds upon the said drum and is attached at one end to the triangular frame formed by the bars 16, 17 and 18. The shaft of the drum 34 is provided with a hand wheel 36. The roller 5 is located immediately behind the harrow member 24 and its tread is of the same breadth as the breadth of the path of the harrow element 24 taken at a right angle to the line of draft. In as much as the harrow member 24 is longer than the roller and is journaled for independent rotation it will thoroughly pulverize the soil in advance of the relative short roller which, however, has impact with the same amount of surface as that operated upon by the harrow.

Having described my invention what I claim as new and desire to secure by Letters-Patent is:—

1. In an agricultural implement, a super-structure, an axle whereon said super-structure is mounted, wheels carried on said axle, a plurality of plow supporting beams attached to said wheels, a harrow frame pivotally attached to all said beams, a triangular frame attached to all said beams along its base, and to said harrow frame at its apex, and means on said super-structure to support said triangular frame at a single point, whereby the plow beams and harrow frame are permitted a degree of adjustment.

2. In an agricultural implement, a super-structure, an axle whereon said super-structure is mounted, wheels carried on said axle, a plurality of plow supporting beams attached to said wheels, a harrow frame pivotally attached to all said beams, a triangular frame attached to all said beams along its base and to said harrow frame at its apex, and means supported on said super-structure attached to said triangular frame at a single point and arranged to raise and lower the same.

In testimony that I claim the foregoing as my own, I have hereto affixed my signature in the presence of two witnesses.

CLOYD MARVIN.

Witnesses:
Ross J. Wetherald,
C. E. Otto.